(12) United States Patent  
Cheng

(10) Patent No.: US 6,353,880 B1
(45) Date of Patent: Mar. 5, 2002

(54) FOUR STAGE PIPELINE PROCESSING FOR A MICROCONTROLLER

(75) Inventor: Chuck Cheuk-wing Cheng, Saratoga, CA (US)

(73) Assignee: Scenix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 09/121,224

(22) Filed: Jul. 22, 1998

(51) Int. Cl.$^7$ ................................. G06F 9/30
(52) U.S. Cl. ................ 712/200; 712/205; 712/214; 712/215; 712/237; 712/239
(58) Field of Search ............................... 712/200, 205, 712/214, 215, 216, 41, 237, 239, 218

(56) References Cited

U.S. PATENT DOCUMENTS

| | | | | |
|---|---|---|---|---|
| 5,564,029 A | * | 10/1996 | Ueda et al. | 712/216 |
| 5,590,365 A | * | 12/1996 | Ide et al. | 712/218 |
| 5,592,634 A | * | 1/1997 | Circello et al. | 712/239 |
| 5,727,177 A | * | 3/1998 | McMinn et al. | 712/218 |
| 5,856,935 A | * | 1/1999 | Moy et al. | 364/727.01 |
| 5,894,549 A | * | 4/1999 | Cheng | 711/137 |
| 5,951,678 A | * | 9/1999 | Moyer | 712/237 |

* cited by examiner

Primary Examiner—Mark Zimmerman
Assistant Examiner—Mackly Monestime

(74) Attorney, Agent, or Firm—Fenwick & West LLP

(57) ABSTRACT

A system and method for efficiently processing instructions in a pipeline architecture for a microcontroller and maintaining a fixed instruction execution per clock cycle rate is disclosed. The pipeline comprises four stages: an instruction fetch stage, an operand fetch stage, an execution stage, and a write back stage. In a first embodiment, an entire clock cycle is dedicated to the instruction fetch stage to the instruction fetch stage to retrieve instruction data from non-volatile memory in a single clock cycle. In a second embodiment, the operand fetch stage preliminarily decodes the instruction data to determine tasks to be performed to allow the execution stage to perform its time-intensive calculations in a single clock cycle. Additionally, the operand fetch stage initiates the performance of tasks determined from the decoding of the instructions to minimize the time required to perform those tasks by the execution stage. In one embodiment, a read address is generated responsive to determining that a read operation is to be performed by the execution stage. In a third embodiment, a dual port data memory is employed to allow the execution stage and the write back stage to perform read and write operations concurrently, in a single clock cycle. Additional embodiments are disclosed for addressing circumstances in which one stage modifies the data address pointer required by another stage or one stage writes to an data memory location required for a read operation by a previous stage. Thus, a one instruction per clock cycle rate is achieved and maintained.

2 Claims, 9 Drawing Sheets

; Main Program

;

Main

.                  ; Previous instructions of the main program

.                  ;``

.                  ;``

$I_0$                  ; instruction 0

$I_1$                  ; instruction 1

$I_2$                  ; instruction 2

$I_3$                  ; instruction 3

$I_4$                  ; instruction 4

$I_5$                  ; instruction 5

$I_6$                  ; instruction 6

$I_7$                  ; instruction 7

.                  ; Other instructions of the main program

.                  ;``

.                  ;``

.                  ;``

RESET VECTOR      ; End of program

Figure 3

| CYCLE | IF | OF | EX | WB |
|-------|----|----|----|-----|
| 1 | $I_3$ | $I_2$ | $I_1$ | $I_0$ |
| 2 | $I_4$ | $I_3$ | $I_2$ | $I_1$ |
| 3 | $I_5$ | $I_4$ | $I_3$ | $I_2$ |
| 4 | $I_6$ | $I_5$ | $I_4$ | $I_3$ |
| 5 | $I_7$ | $I_6$ | $I_5$ | $I_4$ |

Figure 4

; Main Program

;

Main

.                                      ; Previous instructions of the main program

.                                      ; ``

.                                      ; ``

MOVWF     1d     ; Move the value of W register to

; SRAM location 1d(hex)

MOVF      1d, 0  ; Move the value of SRAM location 1d(hex) to

; W register

.                                      ; Other instructions of the main program

.                                      ; ``

.                                      ; ``

.                                      ; ``

RESET VECTOR       ; End of program

Figure 5

; Main Program

;

Main

.            ; Previous instructions of the main program

.            ; ``

.            ; ``

CLRF      04      ; Clear FSR register to 0

.            ;    ``

.            ;    ``

MOVLW    f0      ; Write data f0 (hex) into W register

MOVWF    04      ; Move data f0 (hex) from W to FSR

MOVWF    1f, 0   ; Move the data at SRAM location ff (hex) into

; W register

.            ; Other instructions of the main program

.            ; ``

.            ; ``

.            ; ``

RESET VECTOR       ; End of program

Figure 8

FOUR STAGE PIPELINE PROCESSING FOR A MICROCONTROLLER

BACKGROUND OF THE INVENTION

1. Field of the Invention

The invention relates to the field of computer microcontrollers and more particularly to the field of pipeline architectures for a microcontroller.

2. Description of Background Art

Microcontrollers are microprocessors integrated with peripherals on a single integrated circuit. They are compact in size and yet retain the computational power of traditional microprocessors, allowing them to be used in a multitude of applications. For example, in a single household, microcontrollers are a part of microwave ovens, televisions, calculators, remote controls, clocks, etc. In a microwave oven, for example, the microcontroller senses the settings keyed in by the user and heats up the food for the set time interval and power level. The microcontroller keeps track of real time and produces a beep to notify the user when the heating is done. The microcontroller also displays the status of the microwave oven on a suitable display, typically an LCD or LED.

Every car has about twenty microcontrollers. In a car, they are used in the engine control modules, the antilock braking systems, the sound systems, the airbags, and automobile suspension control modules. In antilock braking systems, the microcontroller monitors the rotational speed of the tires through sensors attached to the tires. When the driver applies the brakes, the microcontroller determines whether any of the tires have locked. If any of the tires are locked, the microcontroller releases the brakes for that tire through a servo-mechanical device coupled to the brakes. Thus, the driver is able to steer the car during emergency braking situations without fear of having the tires lock and causing the car to skid or turn over.

A modern semiconductor microcontroller is basically a low-cost computer adapted to provide rapid solutions to external events after intensive computation. The microcontroller senses the happening of external events through signals received at input ports and transmits responses to the events through output ports. In order to provide this functionality, a typical microcontroller employs an on-chip Programmable Read Only Memory (PROM) to store its instructions, an on-chip data RAM to store the data temporarily, a Central Processing Unit (CPU) to execute the instructions stored in the PROM, an oscillator driver to generate the system clock, and other application-specific peripherals such as timers, interrupt handlers, watchdogs, analog comparators, etc.

The majority of consumer electronics applications use 8-bit microcontrollers. However, modern consumer electronic devices are requiring more powerful processing from their microcontrollers while attempting to maintain or reduce their costs. Existing 8-bit microcontrollers are unable to meet the heightened performance requirements of modem applications. Sixteen-bit or thirty-two bit microcontrollers may be able to provide the processing power required by the modern applications; however, these microcontrollers are also very expensive.

A second problem with existing microcontrollers is their inflexibility. The market window of consumer electronics devices has become extremely short, and the consumer electronics design houses have been forced to reduce their design and manufacture cycle. However, in order to shorten the design and manufacture cycle, a flexible microcontroller is needed that can be rapidly reconfigured to meet the changing needs of the design house. One method of maintaining flexibility in design is to use software to emulate the hardware functions of consumer electronics devices. For example, the design house may use software to implement software timers, software modems, software analog-to-digital converters, etc. However, software emulation of hardware requires an extremely high performance microcontroller. Moreover, in order to correctly emulate hardware devices, the microcontroller must use a fixed number of clocks to execute every instruction. This ensures that the software emulation precisely replicates the hardware. However, existing microcontrollers cannot ensure that instructions are executed in a fixed number of clock cycles.

Therefore, a microcontroller is needed which can meet both the heightened performance requirements of modem applications and ensure that instructions are executed in a fixed number of clock cycles, without requiring the use of more expensive hardware.

SUMMARY OF THE INVENTION

The invention is a system and method for efficiently processing instructions in a pipeline architecture for a microcontroller and maintaining a fixed instruction execution per clock cycle rate. The pipeline preferably comprises four stages, an instruction fetch stage, an operand fetch stage, an execution stage, and a write back stage. In a first embodiment, the instruction fetch stage retrieves instruction data from non-volatile memory in a single clock cycle. Thus, by dedicating a single clock cycle to the instruction fetch, instructions are retrieved from non-volatile program memory without incurring pipeline delay, as in conventional systems. In a second embodiment, the operand fetch stage is coupled to the instruction fetch stage and preliminarily decodes the instruction data to determine tasks to be performed. By preliminarily decoding instructions in a separate stage, the execution stage is able to perform its time-intensive calculations in a single clock cycle. Additionally, the operand fetch stage initiates the performance of tasks determined from the decoding of the instructions. For example, in one embodiment, responsive to determining a task requires a read operation to be performed by the execution stage, the operand fetch stage generates a read address. As performing a read operation is one of the most time-critical operations of the pipeline, having the operation initiated in a previous stage allows the read operation to be performed without delay.

In a third embodiment, the execution stage and the write back stage perform read and write operations concurrently. This is preferably accomplished by using a dual port data memory coupled to the operand fetch stage, the execution stage, and the write back stage. Thus, the execution stage can perform a read operation in a single clock cycle, and the write back operation can perform a write operation in the same clock cycle. Another time-saving advantage is obtained by having the execution stage generate a write address for the write back stage. As performing the write operation is also time-intensive, having the write address generated in a previous stage allows the write operation to have an entire clock cycle to perform its write operation. Additional embodiments are disclosed for addressing circumstances in which one stage modifies the data address pointer required by another stage or one stage writes to an data memory location required for a read operation by a previous stage. All of the above embodiments allow a microcontroller to execute one instruction in each clock cycle, which is an execution rate which meets or exceeds the high performance required by modern applications. The present invention also maintains a fixed single instruction per clock cycle rate, which allows the use of this microcontroller for hardware emulation applications. Finally, the microcontroller design of the present invention may be implemented as an eight-bit microcontroller, thus providing significant savings over other solutions.

BRIEF DESCRIPTION OF THE DRAWINGS

FIG. 3 illustrates instructions of a main program to be processed by the microcontroller of FIG. 1.

FIG. 4 is a timing diagram in clock cycles of the processing of the instructions of FIG. 3

FIG. 5 illustrates a main program which attempts to perform read and write operations to the same data memory address in a single clock cycle.

FIG. 8 illustrates a main program in which a first instruction modifies the value of FSR and a second instruction generates a read address in the same clock cycle.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digits of each reference number corresponds to the figure in which the reference number is first used.

Figure 1:
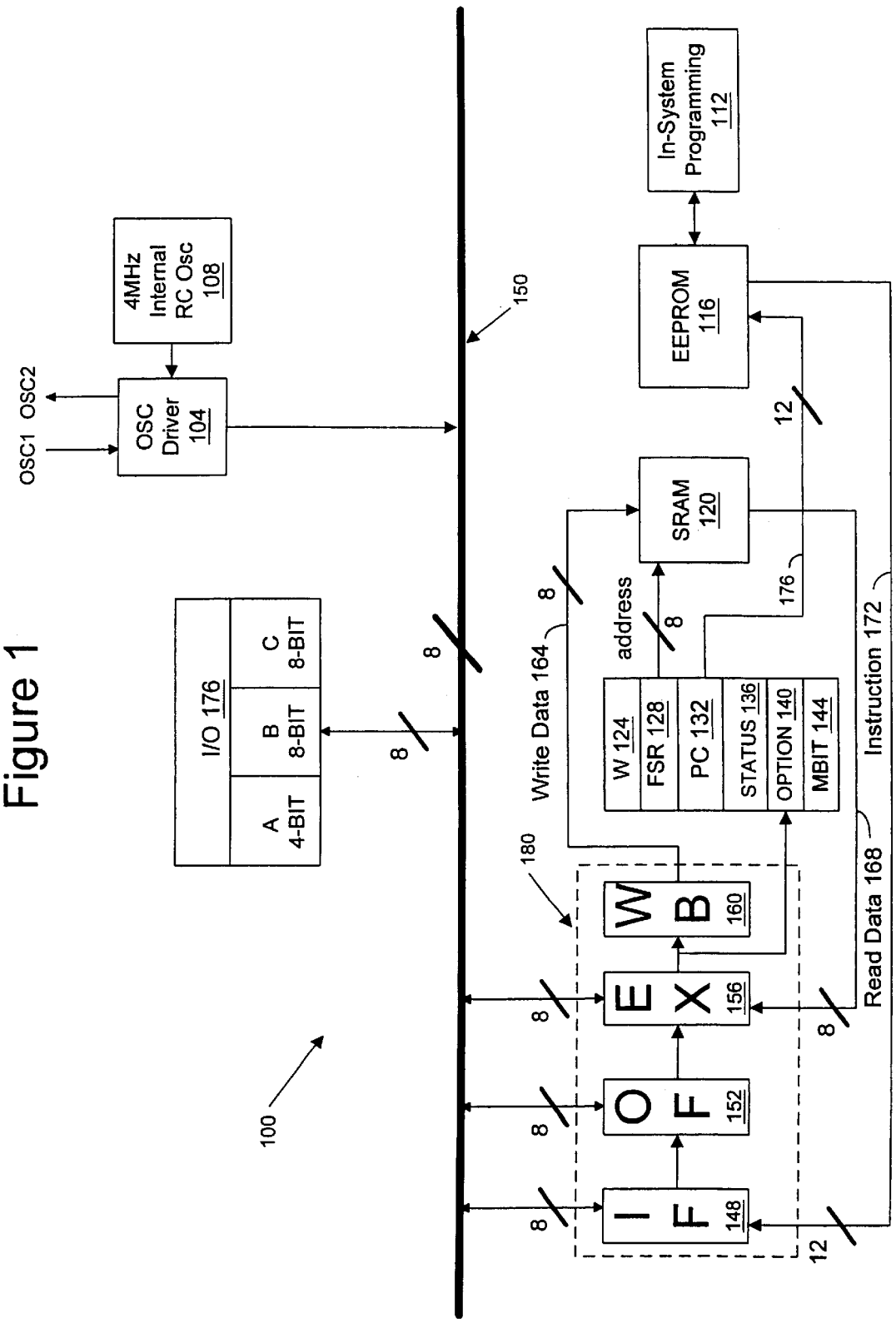
FIG. 1 is a block diagram of a microcontroller according to one embodiment of the present invention.

FIG. 1 illustrates one embodiment of a microcontroller 100 according to the present invention. An oscillator driver 104 (OSC) is coupled to an external reference to provide a system clock for the microcontroller 100. The external references are typically crystal oscillators, resonators, or resistors and capacitors depending on the oscillation mode chosen. OSC 104 also distributes the 4 MHz clock generated by the 4 MHz Internal RC (Resistor & Capacitor) Oscillator 108 when this clock is needed. The output of OSC 104 is coupled to a main bus 150 for distribution to the other components of the microcontroller 100.

The I/O port 176 has three individual ports A, B, and C. These ports are general-purpose input/output ports. Port A is 4-bits wide while Port B and Port C are 8-bits wide. Each pin of the ports may be set to receive data or transmit data.

In-System programming circuit 112 (ISP) interfaces with external programmers. Through the clock pins OSC1 and OSC2, ISP 112 communicates with the outside world serially. Depending on the commands ISP 112 receives from external programmers, ISP 112 erases, programs or reads the Electrical Erasable Programmable Read Only Memory 116 (EEPROM) program memory. The ISP 112 allows the microcontroller 100 to be programmed even when the ISP 112 is already soldered and installed in the final end-user system.

The 2 k×12 EEPROM 116 is used as program memory and is typically non-volatile semiconductor storage cells for storing program instructions for the microcontroller 100. The instruction word is 12 bits wide. The EEPROM 116 monitors changes in the PC address. If any bit of the 12 bit PC address pointer changes value, the EEPROM 116 powers up and outputs the instruction pointed to by the new PC address. Otherwise, the EEPROM 116 stays powered down.

The 136×8 Static Random Access Memory 120 (SRAM) is addressable data space. The SRAM 120 is a synchronous RAM and it only samples the control signals Read Data 168 (RD) and Write Data (WE) 164 at the rising edge of the system clock (CLK). When SRAM 120 senses either WE 164 or RD 168 or both are active, the SRAM 120 performs either a Write Operation or a Read Operation or both. The SRAM 120 functions as the register file for the microcontroller 100 and stores the temporary data.

Special primary registers for storing critical machine status data regarding the current state of the microcontroller 100 are also used by the microcontroller 100. These primary registers allow the microcontroller 100 to store critical information on chip. Program Counter 132 (PC), Accumulator 124 (W), microcontroller status register 176 (STATUS), and data memory address pointer 128 (FSR) are four such registers used by the microcontroller 100. W 124 is used by many instructions to store one of the operands. FSR 128 stores the SRAM address pointer information. PC 132 is the program counter and is used to point at the next instruction to be fetched. STATUS 176 is a status register indicating the current status of the microcontroller. Other primary registers include OPTION 140, which is a control register used to configure the microcontroller, and MBIT 144, which is a commonly used temporary register.

Coupled to the primary registers, the SRAM 120, and the EEPROM 116 is the pipeline 180 of the microcontroller 100. The pipeline 180 in accordance with the present invention has four stages: Instruction Fetch (IF) 148, Operand Fetch (OF) 152, Execution (EX) 156, and Write Back (WB) 160.

Figure 2:
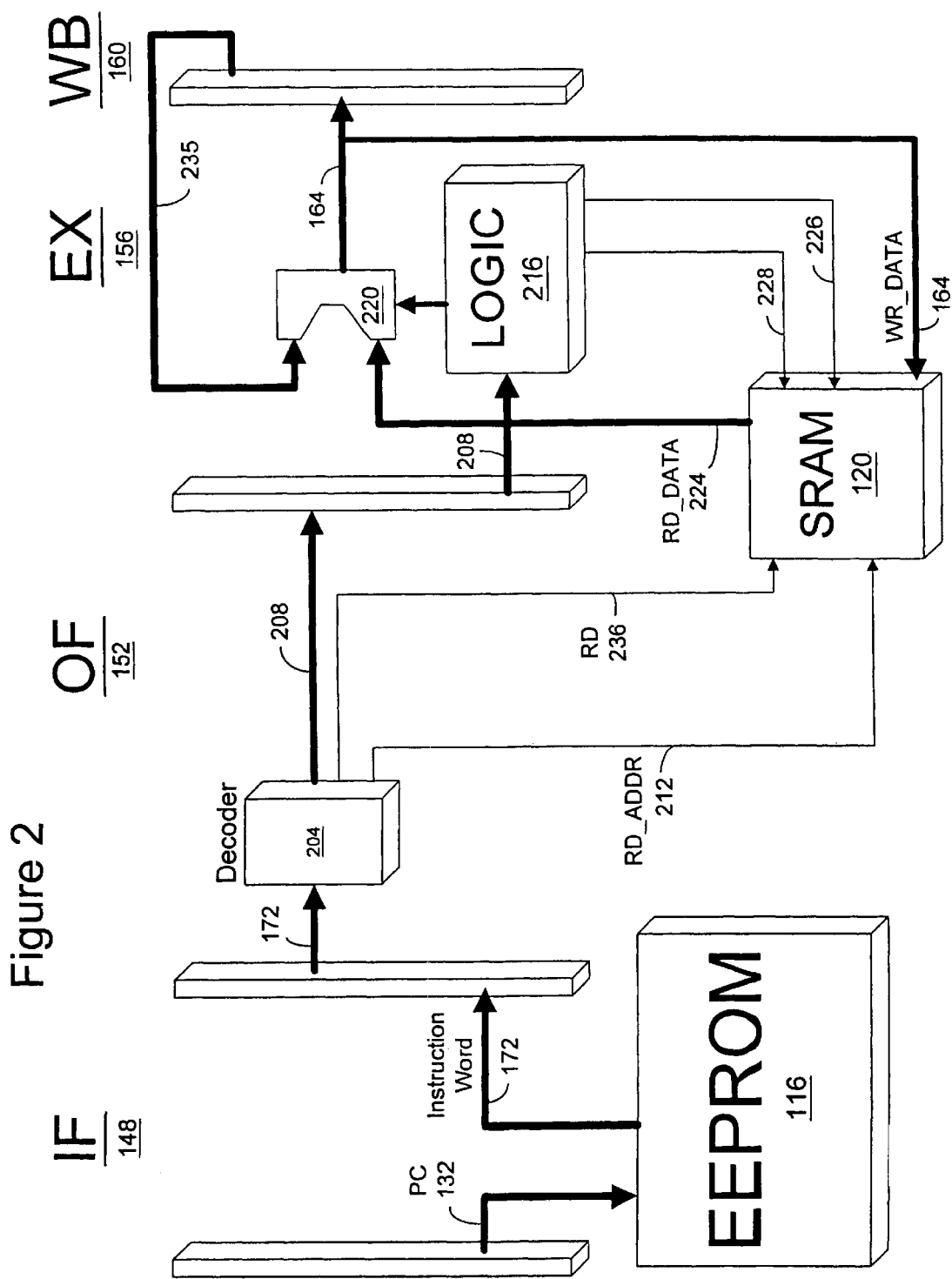
FIG. 2 is a block diagram of the four pipeline stages of the microcontroller of FIG. 1.

In FIG. 2, the pipeline 180 is shown in more detail. Each pipeline stage performs its functions in a single clock cycle. By dividing the functions of a microcontroller 100 into these four stages, a one instruction per clock cycle rate is maintained. The IF stage 148 accesses the EEPROM 116 using the address given by the PC register 132 to fetch the next instruction 172 to be executed. At the next system clock rising edge, the IF stage 148 transmits the instruction word 172 to the OF stage 152. Thus, the PC address is obtained from the PC register 132 and is passed to the EEPROM 116 directly, without any other logic being used. Accessing the EEPROM 116 is typically one of the more time-consuming operations performed by the microcontroller 100, and typically leads to delays in the pipeline in conventional systems. However, in accordance with the present invention, an entire clock cycle is dedicated to accessing the EEPROM 116, which provides sufficient time to complete the operation without incurring delays.

The OF stage 152 performs a preliminary decoding of the instruction word 172 to determine what tasks are to be performed in accordance with the instruction 172. A decoder 204 has an input coupled to receive the instruction word 172, and decodes the instruction word 172 into tens of control signals. Each of control signal enables a specific task to be performed. Tasks to be performed include reading data, writing data, performing arithmetic or logical calculations, transmitting or receiving data through the I/O ports 176, or changing status flags. By performing pre-decoding, the time required to fully decode the instruction in the EX stage 156 is reduced. In conventional systems, the decoding operation performed by an execution stage of a pipeline causes delays in the pipeline due to the complexity of the decoding required. However, in accordance with the present invention, preliminary decoding is performed in a separate stage from the EX stage 156, and thus allows the EX stage 156 to devote more processing capacity to its other functions.

The OF stage 152 also initiates more time-consuming operations, such as reading data from data memory 120. The OF stage 152 generates a read address (RD_ADDR ) 212 and a RD signal 236 and transmits the signals 212, 236 to SRAM 120 in response to determining an instruction 172 is going to require a read operation to be performed by the EX stage 156 in the next clock cycle. This increases the efficiency of the pipeline 180 because the time required to perform a read operation is also the cause of pipeline delay in conventional systems. Generating the read address in the OF stage 152 eliminates the need for the EX stage 156 to perform this function. Instead, when the EX stage 156 performs a read operation, the data to be read has already been retrieved by the data memory 120 using the RD_ADDR 212 generated in the previous clock cycle, and the date is ready to be accessed by the EX stage 156 without delay. Thus, by allotting a separate stage for setting up read operations, the pipeline 180 operates at maximum efficiency, and can maintain its one instruction per cycle rate.

The EX stage 156 performs all of the arithmetic and logical calculations, as well as performing the read operation. The arithmetic logic unit (ALU) 220 in the EX stage 156 has a read input coupled to one part of the data memory 120 and a second input coupled to the W1B stage 160. A logic circuit 216 determines which operations are to be performed upon the data. The logic circuit 216 receives the preliminarily decoded signals from the OF stage 152, and performs further decoding to determine what ALU operation to perform. ALU operations include addition, subtraction, shift-left, shift-right, etc. The ALU 220 performs the calculations on the data received from performing the read operation. The output 164 is transmitted to the WB stage 160 for the write operation.

The EX stage 156 also generates a write address 228 and WR 226 signal to set up a write operation to SRAM 120, if the instruction 172 requires a write operation. The EX stage 156 also writes results 235 of the ALU calculations to flip-flop based registers such as W, FSR, etc. generating the write address 228 in the Ex stage 156 allows the WB stage 160 to devote more processing to its operations.

The WB stage 160 performs write operations to SRAM 120 by transmitting the write data 164 from the ALU operations to SRAM 120. This operation requires a significant amount of time and processing capacity. Thus, by placing this operation a separate stage 160 and allotting a clock cycle for the processing of the stage 160, the write operation is performed without incurring delays.

The above pipeline architecture enables the maximum amount of processing to be performed by a microcontroller in a minimal amount of time. The result of the architecture is a processing rate of one clock cycle for one instruction, which allows the microcontroller 100 of the present invention to meet the performance requirements of modem applications without adding prohibitive costs. As described above, conventional microcontrollers require more than one clock cycle to execute one instruction, often requiring two, three or even fifteen clock cycles to execute an instruction. However, by employing a pipeline architecture having four stages designed to perform the functionality described above, all instructions except branches and "MOVIW" are performed with one clock cycle.

FIG. 3 illustrates a segment of a main program. This program segment is comprised of instructions I0 to I7. I0 is the first instruction to be executed, and then I1, I2, I3, I4, I5, I6, and I7 are executed subsequently.

FIG. 4 illustrates the execution sequence of the instructions of FIG. 3 in clock cycles. In cycle 1, I3 is being fetched from EEPROM 116 in the IF stage 148. I2 is being decoded in the OF stage 152. I1 is being executed in the EX stage 156. I0 is writing back data 164 in the WB stage 160. In cycle 2, I3 is being decoded in the OF stage 152, I2 is being executed in the EX stage 156, and I1 is writing back data 164 in the WB stage 160. Instruction I0 is retired, and new instruction I4 is being fetched from EEPROM 116 in the IF stage 148. If instruction I3 requires a read operand from the SRAM 120, the correct RD_ADDR and RD signals 212, 236 are generated in the OF stage 152.

In cycle 3, I3 is being executed in the EX stage 156 and I2 is writing back results 164 in the WB stage 160. If I3 requires data to be written to SRAM 120, the correct WR_ADDR 228 and WR signals 226 are generated in the EX stage 156. I4 is being decoded in the OF stage 152. I1 is retired, and new instruction I5 is being fetched from EEPROM 116 in the IF stage 148. In cycle 4, I3 is writing back results 164 from the ALU operations in the WB stage 160. I2 is retired. New instruction I6 is being fetched from EEPROM 116 in the IF stage 148. I5 is being decoded in the OF stage 152. I4 is being executed in the EX stage 156. In cycle 5, I3 is retired. New instruction I7 is being fetched from EEPROM 116 in the IF stage 148. I6 is being decoded in the OF stage 152. I5 is being executed in the EX stage 156. I4 is writing back results 164 in the WB stage 160. Therefore, as can be seen in the above example, in accordance with the pipeline architecture of the present invention four clocks are required to execute four instructions. Thus, the goal of executing one instruction per clock is achieved, allowing a microcontroller 100 designed in accordance with the present invention to meet or exceed the processing requirements of modem applications, and to be used in applications requiring a fixed instruction per clock rate.

To achieve a one instruction execution per clock cycle rate, the pipeline 180 must be able to perform the read operation in the EX stage 156 and the write operation in the WB stage 160 concurrently, i.e., perform the write operation for a first instruction in the WB stage 160 and perform the read operation for a second instruction in the EX stage 156 in the same clock cycle. Therefore, a dual port SRAM 120 is used in a preferred embodiment of the present invention. The dual-port SRAM 120 has a read data output coupled to the EX stage 156 and a write data input coupled to the WB stage 160. Thus, both stages 156, 160 have access to the data memory 120 simultaneously. In operation, the read address 212 and read enable (RD) signal 236 are generated for a first instruction in the OF stage 152. Then, they are transmitted to the SRAM 120. In the EX stage 156, the SRAM sends out the data (RD_DATA) 168 for the location pointed by the RD_ADDR 212 in the next clock cycle. The RD_DATA 168 is used by the ALU 220 as an operand in the EX stage 156 to generate the result data 164. The WB stage 160 writes the result data 164 in a next clock cycle back to the SRAM 120 at a write address (WR_ADDR) 228 specified by the logic circuit 216 of the EX stage 156 in the previous clock cycle. Conflicts arise in the circumstance where read and write operations are designated for the same data address in the SRAM 120 in the same clock cycle.

In FIG. 5, a program which generates this conflict is illustrated. The "MOVWF 1d" instruction attempts to write data at the W register 124 to the SRAM location 1d (hex). The write operation occurs in the WB stage 156. The "MOVF 1d, 0" instruction attempts to move the data at SRAM location 1d(hex) into the W register 124. To perform the move operation, the data at the SRAM location 1d(hex) must be read first, and the read operation is performed in the EX stage 156. Executing these two instructions will cause an error, unless accounted for by additional circuitry. For example, if the W register 124 stores "1" and SRAM location 1d(hex) stores "2" prior to the execution of the "MOVWF 1d," after the execution of instruction "MOVF 1d, 0", the W register 124 and SRAM location 1d(hex) should both store the value "1." However, in operation, the execution of the two instructions results in the W register 124 storing "2" and the SRAM location 1d(hex) storing "1." This occurs because, in one clock cycle, the value of W is written to SRAM location 1d, causing the value of '1' to be stored in SRAM location 1d. However, in that same clock cycle, the value within SRAM location 1d is being read by the EX stage 156. Since the data for the read operation is retrieved in the previous cycle to optimize the read operation, the EX stage 156 reads the value '2' from SRAM location 1d, instead of reading the newly written value '1'. This conflict must be resolved without adversely affecting the throughput of the pipeline 160.

Figure 6:
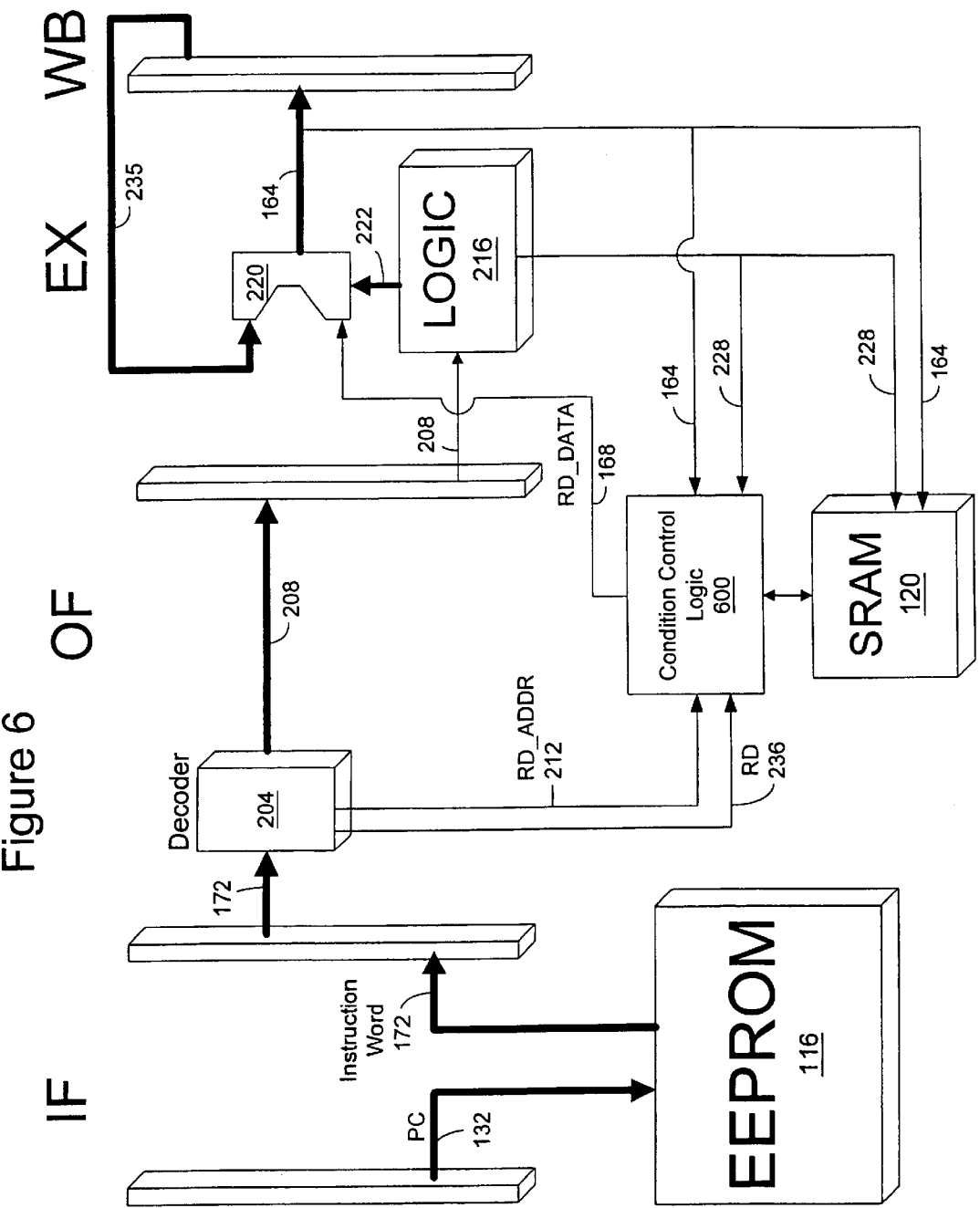
FIG. 6 is an embodiment of the microcontroller in accordance with the present invention for performing read and write operations to the same data memory address in a single clock cycle.

FIG. 6 illustrates an embodiment of the present invention which solves this problem while maintaining the one instruction per cycle throughput. Conditional control logic 600 is coupled to the decoder 204, the data memory 120, the logic circuit 216, the data memory input of the ALU 220, and the output 164 of the ALU 220. The conditional control logic 600 compares the write address 228 generated by the logic circuit 216 and the read address 212 generated by the OF stage 152. If the two address match, the microcontroller 100 knows a situation as described in FIG. 5 is going to occur. Thus, if the two addresses match, the read enable signal (RD) 236 is disabled. Therefore, no data is retrieved by the data memory 120, and the EX stage 156 does not receive the incorrect data from the SRAM 120 in the next cycle. However, the write operation of the WB stage 160 is permitted to continue, and the data 164 is written to the specified address in data memory 120.

In the same clock cycle, the write data (WR-DATA) 164 is stored by the condition control logic 600 as it is being written to data memory 120. In the next clock cycle, when the instruction which is currently in the OF stage 152 moves to the EX stage 156, the instruction will require the results of the read operation which was previously disabled. The write data 164 stored by the control logic 600 is then provided to the EX stage 156 as the input 168 to the read operation. Thus, the pipeline 160 continues to process instructions at a one instruction per clock cycle rate.

Figure 7:
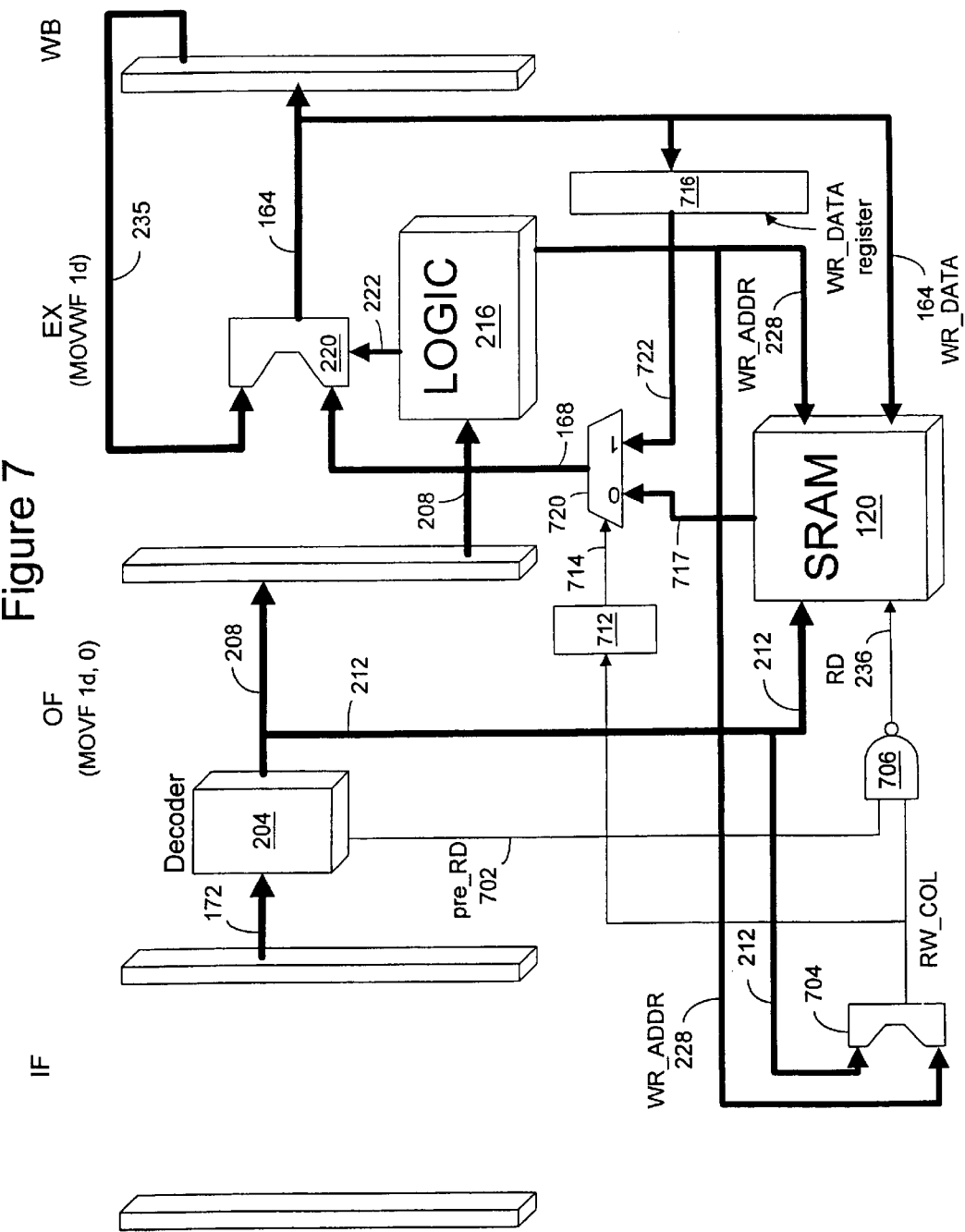
FIG. 7 is a more detailed block diagram of the condition control logic of FIG. 6.

FIG. 7 illustrates a more specific embodiment of the condition control logic 600. In this embodiment, the example of FIG. 5 is used to illustrate the processing of the pipeline 160. The Pre_Rd address 702 of a second instruction and the write address 228 of a first instruction are compared by a comparator 704. The output of the comparator 704 is transmitted to a logic device 708 which is a NAND gate in this embodiment. The output of the comparator 704 is coupled to a first input of the logic device 708, and is high or 'one' when a match is found. The other input of the logic device 708 is coupled to the output of decoder 204 for receiving a pre-read signal 604. A pre-read signal 702 is generated by the decoder 204 in response to determining that an instruction 172 will require a read operation to be performed by the EX stage 156. The pre-read signal 702 is set high or equal to a value of 'one' when a read operation will be required. The output of the logic device 706 is the read enable signal 236, and is coupled to the data memory 120. The read enable signal 236 allows a read operation to be performed when set high or 'one.' Thus, the logic device disables a read operation only in response to the comparator 704 and the pre-read signal 702 both being high, which indicates that a match was found between the read address 212 and the write address 228, and that a read operation will be required by the instruction 172 currently in the OF stage 152.

The output of the comparator 704 is also coupled to a temporary register 712 which stores the result of the comparison. The register is also coupled to an enable input of a multiplexer 720. The multiplexer 720 has two data inputs, a first input is coupled to the read data output of the data memory 120, and the second input is coupled to a write data register 716, which stores the output of the write data operation of the WB stage 160. When the comparator 704 indicates a match, the output, a high, is stored in the temporary register 712, as described above. In the next clock cycle, the instruction which was in the OF stage 152 is now in the EX stage 156. The value 714 of the register 712 is passed to the multiplexer 720 as the enable input. If the enable input receives a high or 'one,' the multiplexer 720 selects the input 722 from the write data register 716 to be coupled to the ALU 220. This enables the correct data for performing the read operation, i.e., the data 164 written into the data memory 120 in the previous cycle, to be used as the data for the read operation in the next cycle.

If the comparator output is low, which indicates that read and write addresses do not match, the multiplexer 720 selects the output 224 from the data memory 120 providing the addressed data 717 from the data memory 120 to the ALU 220. Thus, in the above example, the value "1" is stored in the WR_DATA register 716 as a result of the write operation of the "MOVF 1d" instruction, and is forwarded to the multiplexer 720 when the instruction "MOVF 1d, 0" is being executed in the EX stage 156 in the following clock cycle. When the instruction "MOVF 1d, 0" is being executed in EX stage 156, the data 722 from WR_DATA register 716 is read rather than the data from the SRAM 120. Thus, the values of W and 1d(hex) are both "1" after the operation of the present invention. The above design successfully solves the conflict described above while still maintaining a high throughput for the pipeline 160. It also maintains the fixed number of clock per instructions design goal for emulation applications, as almost all of instructions are executable in one clock cycle. Although the above description embodies a specific implementation of logic hardware to achieve the desired results, other logic hardware implementations can be used to achieve the same results and are considered within the scope of the present invention.

In order to execute an instruction in every clock cycle, the pipeline 180 must complete the read operation in the EX stage 156 in every clock cycle. The read address 212 is generated in the OF stage 152 from the value of the FSR register 128 and the operand embedded inside the instruction 172. Bits 7, 6, and 5 of RD_ADDR 212 are derived from FSR bits 7, 6, and 5 respectively. Bits 4, 3, 2, 1, and 0 of RD_ADDR 212 are derived from bits 4, 5, 3, 2, 1, and 0 of the read instruction. A problem occurs if an instruction 172 in the EX stage 156 modifies the value of the FSR register 128. Instead of using the new value of the FSR 128 to generate the read address 212 for the next instruction in the OF stage 152, the old value of FSR 128 is used. This leads to an incorrect address 212 being generated by the instruction 172 in the OF stage 152, and therefore leading to an incorrect read operation being performed by that instruction 172 upon its execution in the EX stage 156.

FIG. 8 illustrates a program which generates this type of conflict. The "CLRF 04" instruction clears the FSR register 128 to 0. The "MOVLW f0" instruction writes a value f0 (hex) into the W register 124. In the EX stage 156, the "MOVWF 04" instruction attempts to write the data (fD hex) at W register 124 to FSR 128. The "MOVWF 1f, 0" instruction attempts to write the data at SRAM location ff (hex) to W register 124. If properly executed, after the execution of instruction "MOVWF 1f0" the data at W 124 and SRAM location ff(hex) should be equal. However, if the read address for the "MOVWF 1f, 0" instruction is generated from the previous value of FSR, the SRAM location 1f (hex) is accessed for the read operation of "MOVWF 1f,0" instead of the SRAM location ff (hex). Therefore, the MOVWF 1f0 instruction will move data from the wrong register to W 124. In order to provide accurate processing, this circumstance must be addressed.

Figure 9:
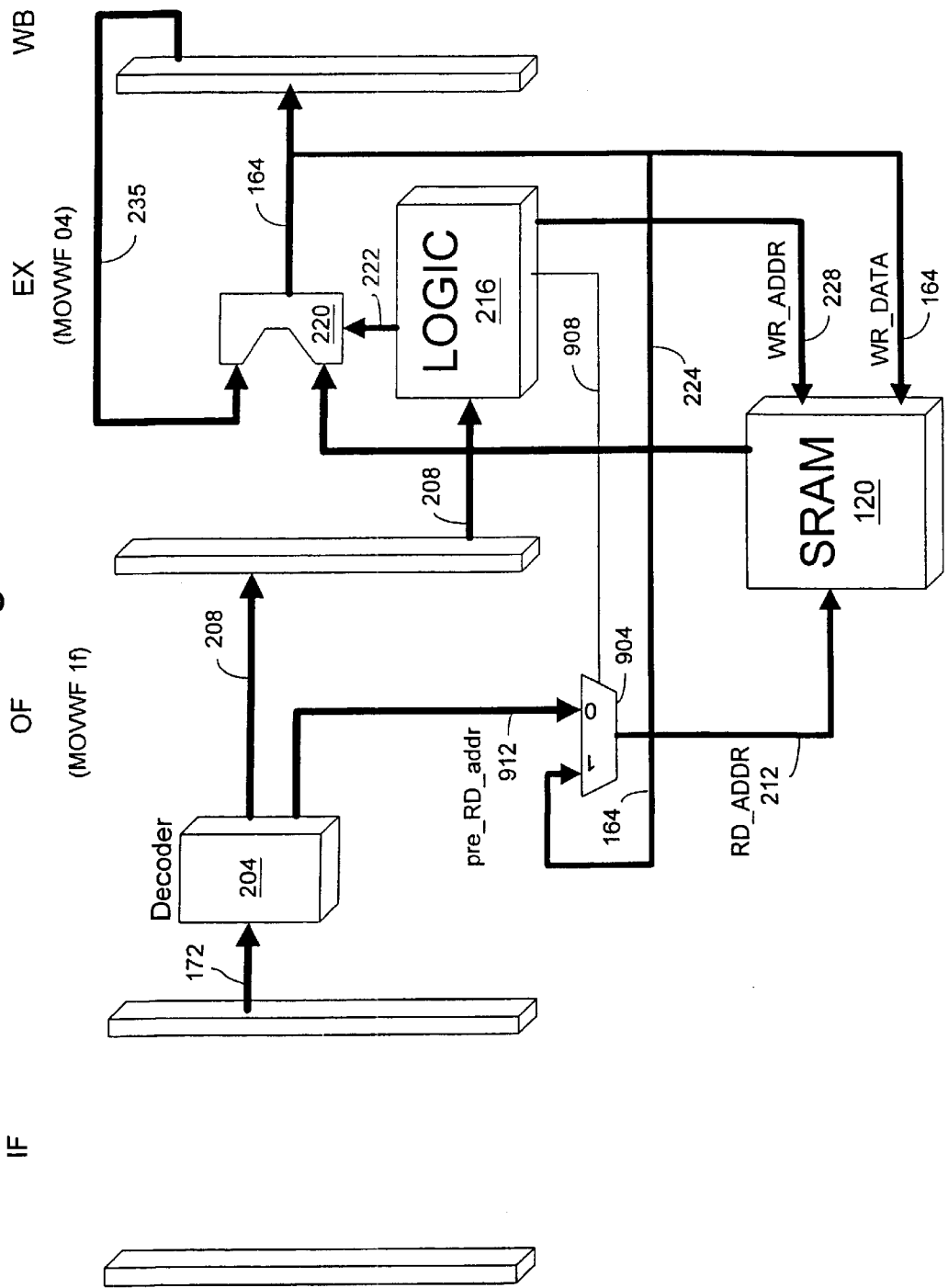
FIG. 9 is an embodiment of the microcontroller in accordance with the present invention for transferring the value of FSR to a previous stage when a first instruction modifies the value of FSR and a second instruction generates a read address in the same clock cycle.

In FIG. 9, an embodiment of the present invention is shown in which the result data 164 from the execution of a first instruction which modifies the FSR 128 is passed to the OF stage 152 in order to allow a previous instruction to generate a correct read address 212. A wr_FSR signal 908 coupled between logic 216 and a second condition control device 904. Logic 216 sets the wr_FSR signal 908 to high or "one" in response to decoding an instruction in the EX stage 156 and determining that the instruction will modify the FSR 128. In this embodiment, condition control logic device 904 is a multiplexer. The condition control logic device 904 has a first input coupled to a pre-read address signal 912 output of the decoder 204, and a second input coupled to the result signal 164 output from the ALU 220. The output of the condition control logic device 904 is the read address signal 212, which is transmitted to the SRAM 120 to provide the requested data 168 to the EX stage 156 in the next clock cycle.

If the wr_FSR signal 908 is high, the condition control logic uses the result data 164 to generate the read address 212. If the wr_FSR signal 908 is low, the condition control logic 904 selects the existing value of FSR 128 to generate the read address. Thus, an instruction which modifies the FSR 128 does not cause an error to be committed by the next instruction, in accordance with the present invention. In the above example, in a first clock cycle, the wr_FSR signal 908 is generated in response to the MOV WF 04 command, which moves data from W 124 to FSR 128. During this clock cycle, the value of FSR 128 is 0 but the value of FSR 128 will be changed to f0 at the next rising edge of the clock. If the logic in the OF stage 152 uses the current value of FSR 128 to generate the RD_ADDR 212, the RD_ADDR 212 that will be generated is 1f (hex). However, in accordance with the present invention, the new value of FSR (f0 hex) is used to generate the read address 212, and, thus, the SRAM location ff (hex) is properly generated. Thus, the FSR 128 is modified by a first instruction in a first stage while permitting a previous instruction to correctly generate a read address 212 in a previous stage. This is accomplished without reducing the throughput of pipeline 180, and maintains the fixed instruction per clock ratio, at one instruction per clock cycle.

Thus, in accordance with the present invention, by subdividing the tasks needed to execute an instruction into four stages, IF, OF, EX, and WB, by designating a full clock cycle for accessing the EEPROM 116, maximizing the amount of time allotted for generating RD_ADDR and RD signals 212, 236 and performing preliminary decoding in a separate stage to allow as much time as possible for execute instructions provides for the maximum throughput for a pipeline 180. The microcontroller 100 is therefore able to perform more operations within a fixed period of time than prior art microcontrollers, as all instructions except branches and "MOVIW" are executed within one clock cycle.

To maintain the throughput of the pipeline 180, the pipeline 180 should perform the read operation in the EX stage 156 and the write operation in the WB stage 160 concurrently. Therefore, a dual port SRAM 120 is used to support concurrent read operations and write operations in the same clock cycle. If the read and write operations are to be performed on the same address in data memory 120, the write data 164 stored in WR_DATA register 716 is forwarded to the read data input of the ALU 220 when the previous instruction is being executed. If the instruction in the EX stage 156 modifies the FSR 128, a signal "wr_FSR" 908 is generated to select the result 164 of the ALU 220 to be used to generate the proper read address 212 for the previous instruction. Thus, the accuracy of the processing of the pipeline 180 is maintained while still providing a fixed one instruction per clock cycle throughput.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A pipeline for processing instructions for a microcontroller in four stages, wherein operations in each stage are performed concurrently in a single clock cycle, comprising:

data memory for retrieving data in response to receiving a read address and storing data in response to receiving a write address, said data memory comprising:
   a first port, coupled to a read input of the execution stage, for transmitting retrieved data to the execution stage; and
   a second port, coupled to a write data output of the write back stage, for receiving the write address and the results of calculations from the write back stage;

an instruction fetch stage, for retrieving instruction data from non-volatile memory;

an operand fetch stage, coupled to the instruction fetch stage and said data memory, for decoding the instruction data to determine a task to be performed responsive to the instruction data, for generating a read address responsive to the task requiring a read operation, and for transmitting the read address to said data memory;

an execution stage, coupled to the operand fetch stage and said data memory, for receiving data specified by the read address from said data memory, for generating a write address responsive to the decoded instruction data requiring a write operation to be performed, for generating control signals from the decoded instruction data, and for performing calculations responsive to the control signals on the received data;

a write back stage, coupled to the execution stage for writing results of the calculations to said data memory at a location specified by the write address;

a first condition control logic, coupled to the operand fetch stage, the execution stage, the data memory, and the write back stage, for comparing the write address and the read address of consecutive instructions in a first clock cycle and, responsive to the write address and the read address of consecutive instructions being identical, transmitting a disable signal to an enable input of the data memory to disable a read operation, and coupling a write data register to the write data output for storing a copy of the results of the calculations in the first clock cycle; and, coupling the read input of the execution stage to the write data register to transmit the stored copy of the results of the calculations to the execution stage in a second instruction cycle occurring after said first instruction cycle; and a second conditional control logic, coupled to the operand fetch stage, the execution stage, the data memory, and the write back stage, for, responsive to a first instruction modifying a value in the data address pointer and a second instruction performing a read operation, selecting the modified value, generating a read address responsive to the modified value, and transmitting the generated read address to the data memory.

2. A system for processing instructions for a microcontroller in four stages, wherein operations in each stage are performed concurrently in a single clock cycle, comprising:

a dual port data memory for retrieving data responsive to receiving a read address and storing data responsive to receiving a write address, said dual port data memory comprising:

means for transmitting retrieved data to the execution stage, coupled to a read input of the execution stage; and means for receiving the write address and the results of calculations from the write back stage, coupled to a write data output of the write back stage;

an instruction fetch stage, having a means for retrieving instruction data from non-volatile memory;

an operand fetch stage, coupled to the instruction fetch stage and data memory, having a means for decoding the instruction data to determine a task to be performed responsive to the instruction data, a means for generating a read address responsive to the task requiring a read operation, and a means for transmitting the read address to data memory;

an execution stage, coupled to the operand fetch stage and the data memory, having a means for receiving data specified by the read address from data memory, a means for generating a write address responsive to the decoded instruction data requiring a write operation to be performed, a means for generating control signals from the decoded instruction data, and a means for performing calculations responsive to the control signals on the received data;

a write back stage, coupled to the execution stage having a means for writing results of the calculations to data memory at a location specified by the write address;

means for comparing the write address and the read address of consecutive instructions in a first clock cycle, and, responsive to the write address and the read address of consecutive instructions being identical;

means for transmitting a disable signal to a means for enabling the dual port data memory to disable a read operation during the first clock cycle;

means for storing a copy of the results of the calculations during the first clock cycle;

means for coupling the read input of the execution stage to the means for storing the results of calculations to transmit the stored copy of the results of the calculations to the execution stage during a next clock cycle; and selection means, coupled to said execution stage, for selecting the modified value in response to a first instruction modifying a value in the data address pointer and a second instruction performing a read operation;

means for generating a read address responsive to the modified value; and means for transmitting the generated read address to the dual port data memory.

* * * * *